US 6,678,830 B1

(12) United States Patent
Mustafa et al.

(10) Patent No.: US 6,678,830 B1
(45) Date of Patent: Jan. 13, 2004

(54) METHOD AND APPARATUS FOR AN ACPI COMPLIANT KEYBOARD SLEEP KEY

(75) Inventors: Mazin Mustafa, Houston, TX (US); Mike Provencher, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/347,065

(22) Filed: Jul. 2, 1999

(51) Int. Cl.[7] .................................................. G06F 1/26
(52) U.S. Cl. ...................................................... 713/310
(58) Field of Search ................................ 713/300–340; 710/262, 266

(56) References Cited

U.S. PATENT DOCUMENTS

| | | | | |
|---|---|---|---|---|
| 5,347,167 A | * | 9/1994 | Singh | 307/125 |
| 5,574,920 A | * | 11/1996 | Parry | |
| 5,872,995 A | * | 2/1999 | Chaiken | |
| 5,898,861 A | * | 4/1999 | Emerson et al. | |
| 5,987,560 A | * | 11/1999 | Gulick | |
| 6,044,414 A | * | 3/2000 | Gulick | |
| 6,055,643 A | * | 4/2000 | Chaiken | |
| 6,092,209 A | * | 7/2000 | Holzhammer et al. | |
| 6,105,142 A | * | 8/2000 | Goff et al. | |
| 6,199,134 B1 | * | 3/2001 | Deschepper et al. | |
| 6,219,742 B1 | * | 4/2001 | Stanley | |
| 6,266,776 B1 | * | 7/2001 | Sakai | |

FOREIGN PATENT DOCUMENTS

| EP | 0 908 823 A1 | 4/1999 |
|---|---|---|
| WO | WO99/27434 A1 | 6/1999 |

OTHER PUBLICATIONS

"Advanced Configuration and Power Interface Specification," Intel Misrosoft Toshiba, Revision 1.0b, Feb. 2, 1999.*
"128 Pin Enhanced Super I/O Controller Supporting GPI/O Pins," Standard Microsystems Corporation, Dec. 4, 1996.
"82371AB PCI–TO–ISA/IDE XCELERATOR (PIIX4)," Intel Corporation, Apr. 1997, pp. 1–41, 117–153 and 201–270.
"ACPI Implementers' Guide," Intel Microsoft Toshiba, Feb. 1, 1998.
"Advanced Power Management (APM) BIOS Interface Specification," Intel Corporation and Microsoft Corporation, Revision 1.2, Feb. 1996.
"Key Support and Keyboard Scan Codes for Windows," Microsoft Corporation, Jun. 18, 1999.
"Supporting Wake–up on Legacy Devices," Microsoft Corporation, Jul. 7, 1998.

* cited by examiner

Primary Examiner—Paul R. Myers

(57) ABSTRACT

A computer system includes a status register for receiving events which cause the computer system to change to a low power mode or back to a normal power mode. The status register is selectively coupled to a keyboard controller to receive an interrupt from the keyboard controller when a sleep/wake key is actuated on a keyboard. When the computer system is normally powered, the keyboard interrupt is not routed to the status register. If the computer system is powered down, the keyboard interrupt is routed so that actuation of the sleep/wake key will awake the computer system.

22 Claims, 10 Drawing Sheets

METHOD AND APPARATUS FOR AN ACPI COMPLIANT KEYBOARD SLEEP KEY

BACKGROUND OF THE INVENTION

1. Field of the Invention

The present invention relates generally to power management in a computer system and more particularly to interfacing a keyboard sleep/wake key to a computer system.

2. Description of Related Art

With the advent of portable computers there has always been a need to regulate and conserve power consumed by the computer. However, the need to conserve power now extends to desktops, servers and other types of non-portable computers. Computers are left on to answer phones, receive faxes and connect to each other. All these functions only run when the computer system is consuming power. Therefore, a fully functional computer system with very low power is desirable.

Early attempts at power management included a scheme known as Advanced Power Management (APM). APM basically powers down the computer system to an acceptable power level when it is not in use. However, as the PC platform has evolved and new capabilities and performance have been added to the computer system, APM has no longer been able to meet the power management requirements.

Another attempt to the solve power management issues blended the existing collections of power management basic input/output services (BIOS) code, APM application programming interfaces (APIs), and plug and play BIOS APIs into an Advanced Configuration and Power Management (ACPI) specification hereby incorporated by reference. The ACPI specification describes a mechanism for operating system directed power management (OSPM). However, while ACPI provides mechanisms for certain legacy hardware to wake a sleeping computer, it does not provide guidance for all legacy hardware.

To take advantage of the power management functionality of the ACPI specification it is desirable for the user to wake the computer with the simple push of a button. In the past, a power management function was provided through the power on/off switch. A more convenient method is desirable. Additionally, it is desirable to avoid making changes to the legacy hardware.

SUMMARY OF THE INVENTION

A computer system includes a keyboard having keys and a keyboard controller coupled to the keyboard for generating a keyboard interrupt when a key is actuated. A status register for receiving an event indication that causes the computer system to manage power in response to the event indication is also included. Between the keyboard controller and the status register is routing logic for selectively routing the keyboard interrupt to the status register only if the computer system is in a low power mode.

A special sleep/wake key is provided on the keyboard which when actuated causes special scan codes to be provided to the keyboard controller. If the computer is not in a low power mode, the special scan codes causes the computer to be placed in a low power mode and cause the keyboard interrupt to be routed to the status register. If the computer is in a low power mode, the special scan code causes the computer to wake up and cause the keyboard interrupt to be disabled from the status register. The keyboard controller may be contained in a multifunction input/output controller and the status register may be contained in a south bridge.

The status register may correspond to an advanced configuration and power interface (ACPI) specification. The interrupt generated by the status register may be a system control interrupt or a system management interrupt.

A method of managing power in a computer system having a keyboard coupled to a keyboard controller is also disclosed. The method includes receiving a sleep indication from the keyboard; placing the computer in a low power state wherein certain external events to a status register may awake the computer system in response to the sleep indication; and enabling a connection between the keyboard controller and the status register in response to the sleep indication, the connection for passing a keyboard interrupt to wake the computer system when a wake indication is provided from the keyboard. The method also includes receiving a wake indication from the keyboard; waking the computer in response to the wake indication; and disabling the connection between the keyboard controller and the status register in response to the wake indication.

The computer system may include a programmable interrupt controller selectively connected to the status register. If so, the method may include connecting the status register to the programmable interrupt controller register in response to the sleep indication; and disabling all inputs to the programmable interrupt controller except for an input connected to the status register in response to the sleep indication. The method may also include disconnecting the status register to the programmable interrupt controller register in response to the wake indication; and enabling all inputs to the programmable interrupt in response to the wake indication.

The sleep and wake indications may correspond to special scan codes. The keyboard may also include the capability to ignore all keys except the sleep/wake key. Thus, the method may include providing a command to the keyboard in response to the sleep indication to filter out all scan codes except for scan codes corresponding to a wake indication.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
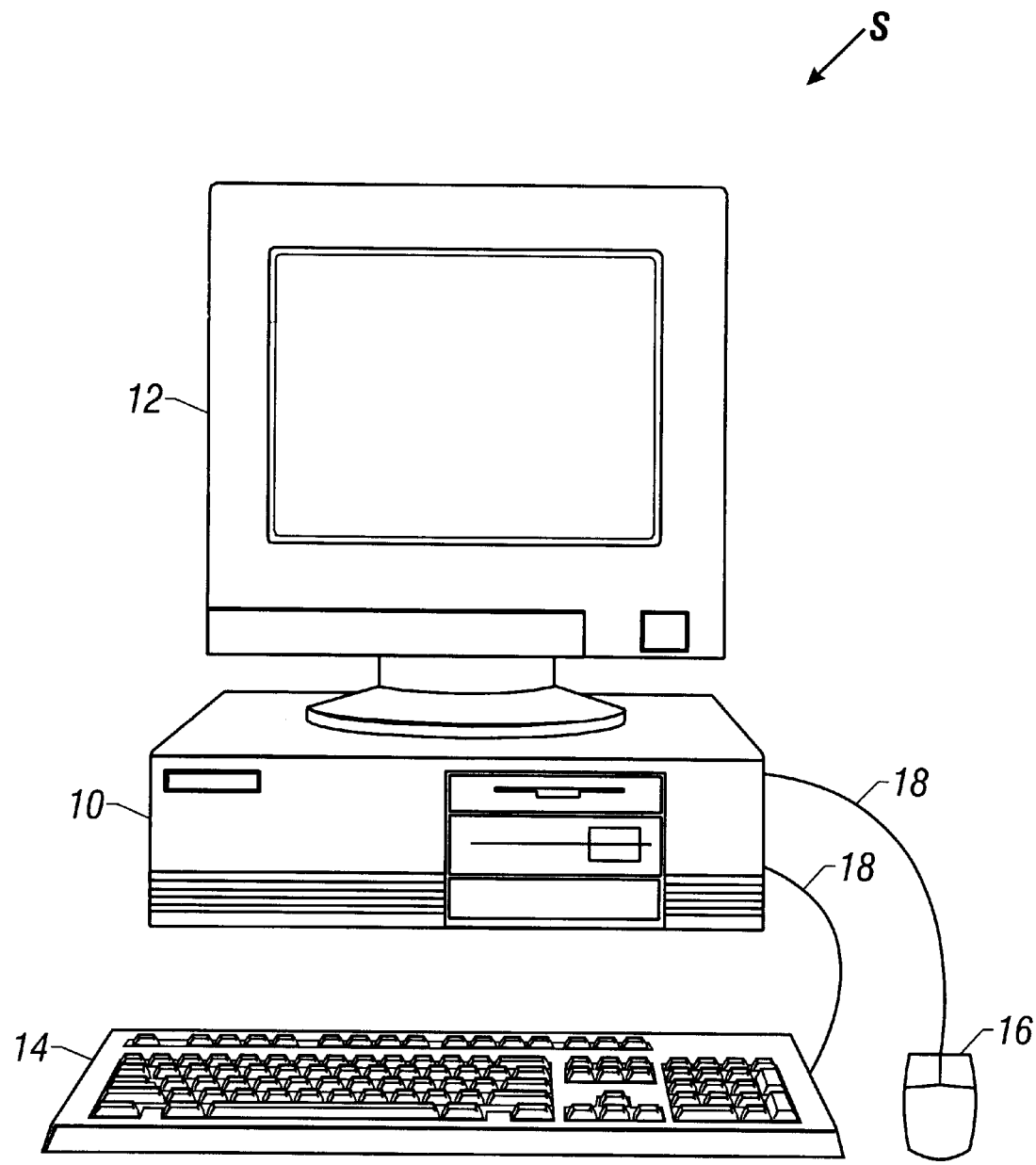
FIG. 1 is a diagrammatical representation of a computer system according to he preferred embodiment.

Referring first to FIG. 1, there is illustrated a computer system S, for example a personal computer (or "PC") according to the preferred embodiment. While the computer system S shown is of an International Business Machines ("IBM") PC variety, the principles of the present invention are equally applicable to other computer platforms or architectures, such as those associated with IBM®, Apple (®, Sun® and Hewlett Packard® with alternate operating systems, such as DOS, UNIX®, LINUX, BEOS, MacOS™ and Solaris™. The present invention is equally applicable to desktop computers, portable computers, servers and multi-processor computers. Preferably the computer system operates with a Microsoft Windows operating system, such as Windows 95, 98 or NT. Additionally, the principles of the present invention are best practiced with hardware and software compliant with an Advanced Configuration and Power Interface Specification (ACPI) revision 1.0b, Feb. 2, 1999, hereby incorporated by reference.

The computer system S is comprised of a central processing unit ("CPU") 10 housing processing, memory, communications, interface, and other circuitry as described more fully below. CPU 10 is connectable to a monitor 12 for displaying graphical information to a user of the system. A keyboard 14 is also connectable to the CPU 10 with a standard PS/2 style connector for inputting data and for selecting desired functions, including putting the computer to sleep and thereafter waking the computer. Additional input devices, such as a pointing device (e.g., mouse) 16 are coupled to CPU 10, providing additional input capabilities.

The components of computer system S are interconnected by data cables 18, which may be standard serial or parallel data transmission assemblies. Alternatively, one or more of the components of computer system S may be configured to transmit and receive data by means of infrared transceivers or various alternative data transmission techniques.

Figure 2:
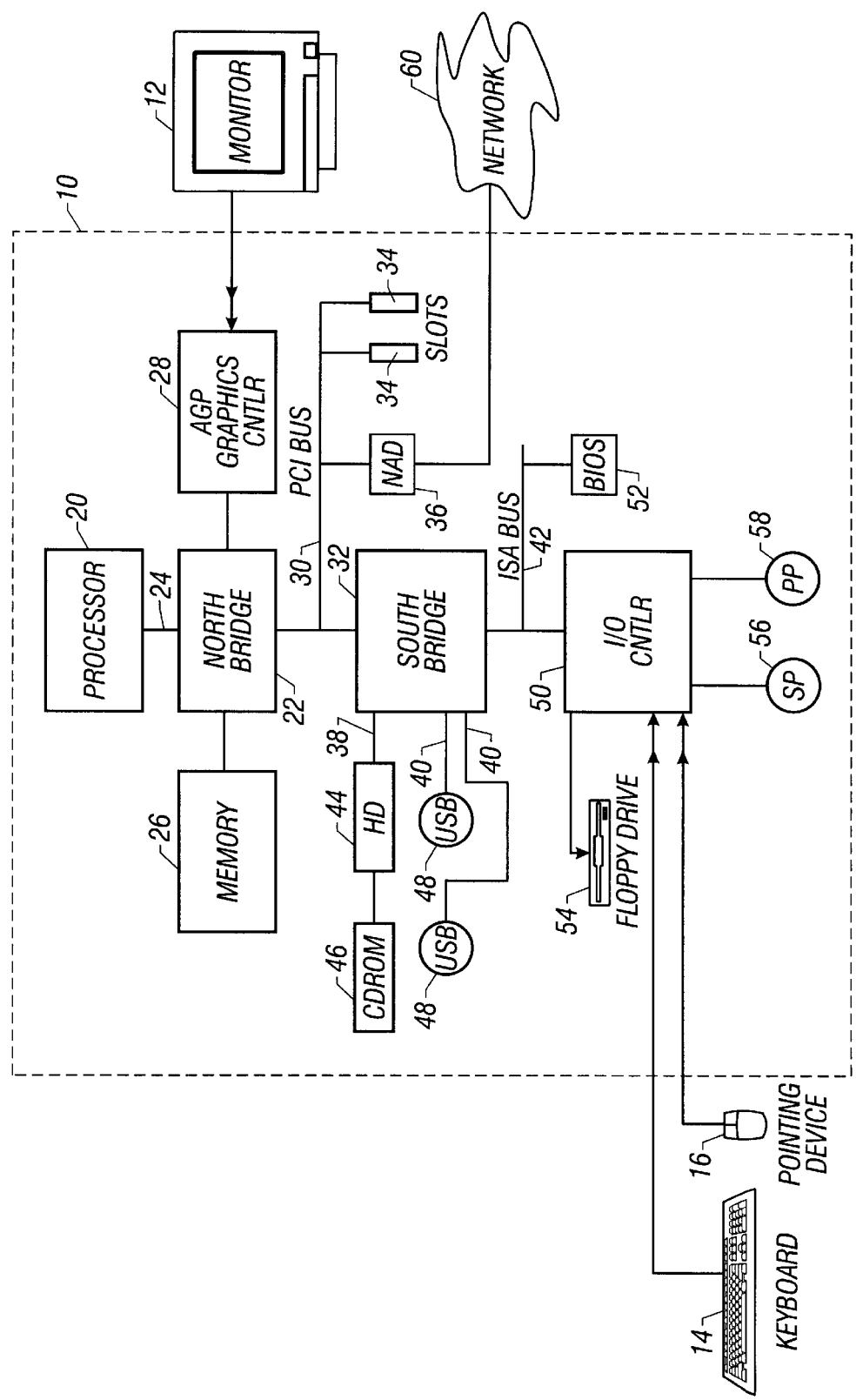
FIG. 2 is a block diagram of a computer system according to the preferred embodiment.

Turning now to FIG. 2, there is illustrated an exemplary block diagram of the circuitry of the computer system S. As is conventional in the art, the computer system S includes a processor 20, such as an Intel® Pentium® II microprocessor or the like. It is understood that alternate processors from Intel, AMD®, Cyrix®, Digital™ (Alpha®) and others may be used. The processor 20 is coupled to a north bridge 22 by a host or processor bus 24. The north bridge 22 includes a memory controller for coupling to an array of memory (e.g. dynamic random access memory "DRAM") 26, an Accelerated Graphics Port ("AGP") interface for coupling to an AGP graphics controller 28, and a Peripheral Component Interconnect ("PCI") interface for providing a PCI bus 30. The AGP graphics controller is further connectable to the monitor 12.

In the computer system S, the PCI bus 30 couples the north bridge 22 to a south bridge 32 and one or more PCI slots 34 for receiving expansion cards (not shown). Further attached to the PCI bus 30 is a network access device ("AND") 36, such as a network interface card or modem for connecting to a network.

The south bridge 32 is an integrated multifunctional component, such as the Intel 82371AB, that includes a number of functions, such as, an enhanced direct memory access ("DMA") controller; interrupt controller; timer; integrated drive electronics ("IDE") controller for providing an IDE bus 38; a universal serial bus ("USB") host controller for providing a universal serial bus 40; an industry standard architecture ("ISA") bus controller for providing an ISA bus 42 and ACPI compliant power management logic. The IDE bus 38 supports up to four IDE devices, such as a hard disk drive 44 and a compact disk read only memory ("CD-ROM") 46. The universal serial bus 40 is connected to a pair of USB connectors 48 for communicating with USB devices (not shown).

In the illustrated computer system S, the ISA bus 42 couples the south bridge 32 to a multifunction input/output (I/O) controller 50 and a basic input/output system (BIOS) ROM 52. The multifunction I/O controller 50, such as a Standard Microsystems Corporation FDC37C68x, typically includes a number of functions, such as a floppy disk drive controller for connecting to a floppy disk drive 54; a keyboard controller for connecting to the keyboard 14 and the pointing device 16; a serial communications controller for providing at least one serial port 56; and a parallel port interface for providing at least one parallel port 58. Alternative multifunction input/output (I/O) controllers are manufactured by National Semiconductor and WinBond. The functions described above may alternatively be implemented in separate integrated circuits or combined differently than described above without departing from the concept of the present invention.

Computer system S is also adapted for connection to a network, such as the internet, designated generally by reference number 60, through the network access device 36. Connection with the network may be made with various alternative configurations, including, but not limited to, conventional telephone wire, integrated service digital network ("ISDN"), digital subscriber lines ("DSL"), and wireless communications.

Figure 3A:
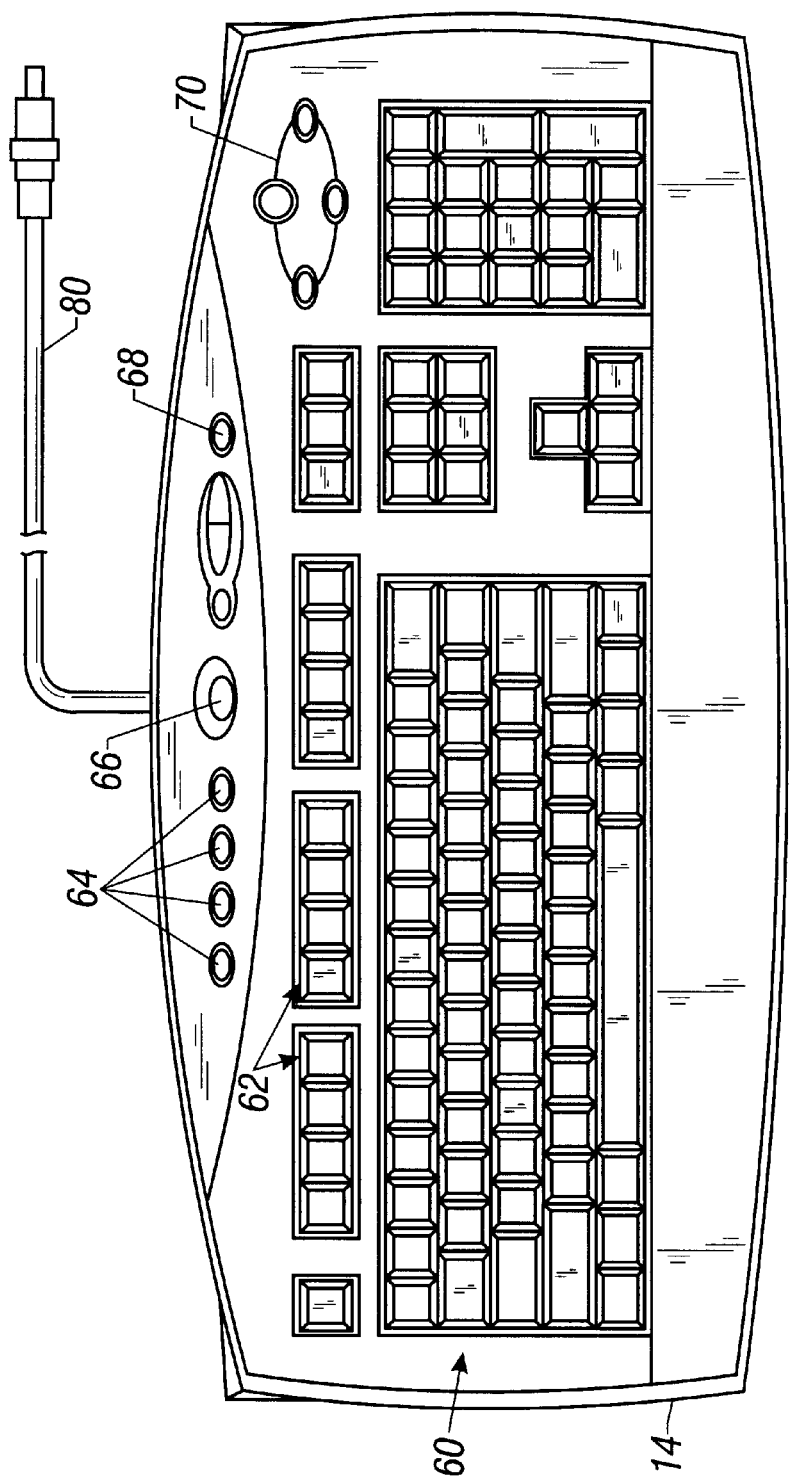
FIG. 3A is a top plan view of a keyboard as illustrated in FIG. 1 including a dedicated key for putting the computer system to sleep and waking the computer, according to the preferred embodiment.
Figure 3B:
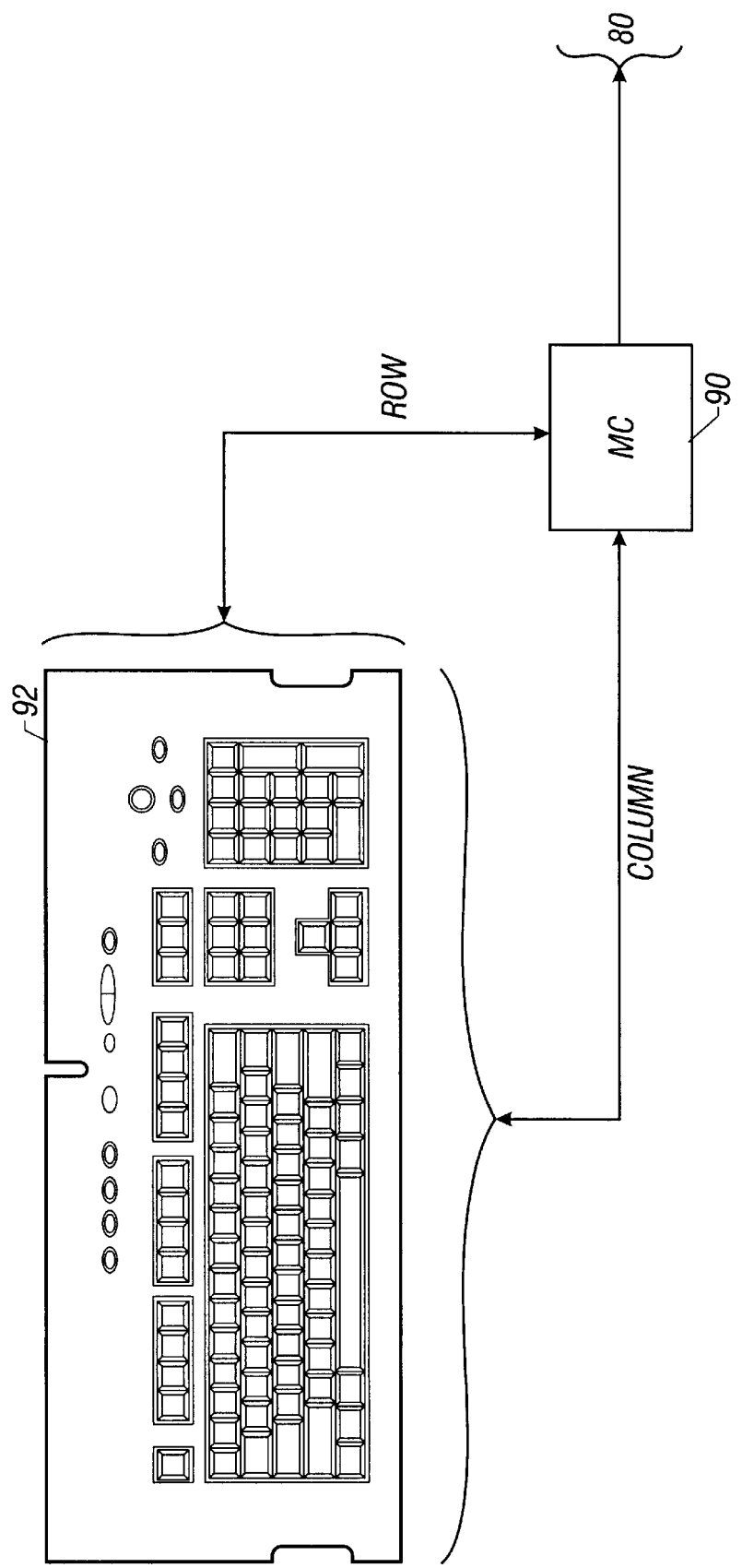
FIG. 3B is an exemplary block diagram of circuitry of the keyboard of FIG. 3A.

FIGS. 3A and 3B illustrate an exemplary qwerty-style keyboard 14, and features of the keyboard for putting the computer asleep. As shown in FIG. 3A, keyboard 14 is configured as a specially adapted, general purpose keyboard including a standard key array or matrix 60 for performing text editing functions and inputting data in a conventional manner. Function keys 62 are provided for executing predetermined functions based upon a particular software applications being run on the computer system.

In addition to standard keys, keyboard 14 includes a series of specialized keys for performing application launch and communication functions. In the illustrated embodiment a series of disk drive control keys 64 are provided. These keys preferably permit the user to command operations of a CD drive, such as for fast forwarding, reversing, searching, and so forth. Additional keys may be provided for supplementary functions, such as for adjusting the volume of speakers included in the computer system. At least one application launch key 68 is provided. Actuation of one of these keys causes a high-level interrupt for opening or launching a specific user-configurable software application, such as a text editing application. Such keys may also be provided for sending or receiving facsimiles, answering telephone calls, and so forth. A series of dedicated keys are also provided in a designated rapid internet access array 70. These keys permit the user to launch internet access application software, log on to the internet, and to navigate directly to specific internet sites without the need to navigate through a series of screen-based menus. These keys are more fully described in copending U.S. patent application Ser. No. 09/093,246, entitled "Rapid Network Access Computer System," filed Jun. 8, 1998, and hereby incorporated by reference. The keyboard 14 includes a PS/2 style cable assembly 80 for providing data transfer to the computer console.

Finally, of significance to the present invention is a sleep mode key 66 is provided for placing the computer system in a low power consumption mode and thereafter waking the computer.

Now referring to FIG. 3B, there is illustrated an exemplary block diagram of the circuitry of the keyboard 14. A keyboard scan controller 90, such as an Intel 8051 class microcontroller, includes ports for reading and writing which are coupled to a row/column matrix of key switches 92. The operation of the keyboard scan controller 90 includes the steps of scanning the matrix 92 of rows and columns one row at a time for an actuated key. If one of the particular elements in a particular driven column is switched or actuated, a connection is completed and sensed on a scanned row by the keyboard processor 90, as is well known to those of ordinary skill in the art. A scan code is generated from the row/column combination. Preferably, the sleep mode key 66 is assigned a unique key with a unique scan code for transmission over the data cable 80 to the computer system S. Alternatively, as will be discovered below, the sleep mode function could be assigned to any multi-purpose key, such as the "Ctl-Alt-S" or "Alt-Pause" keys.

Figure 4A:
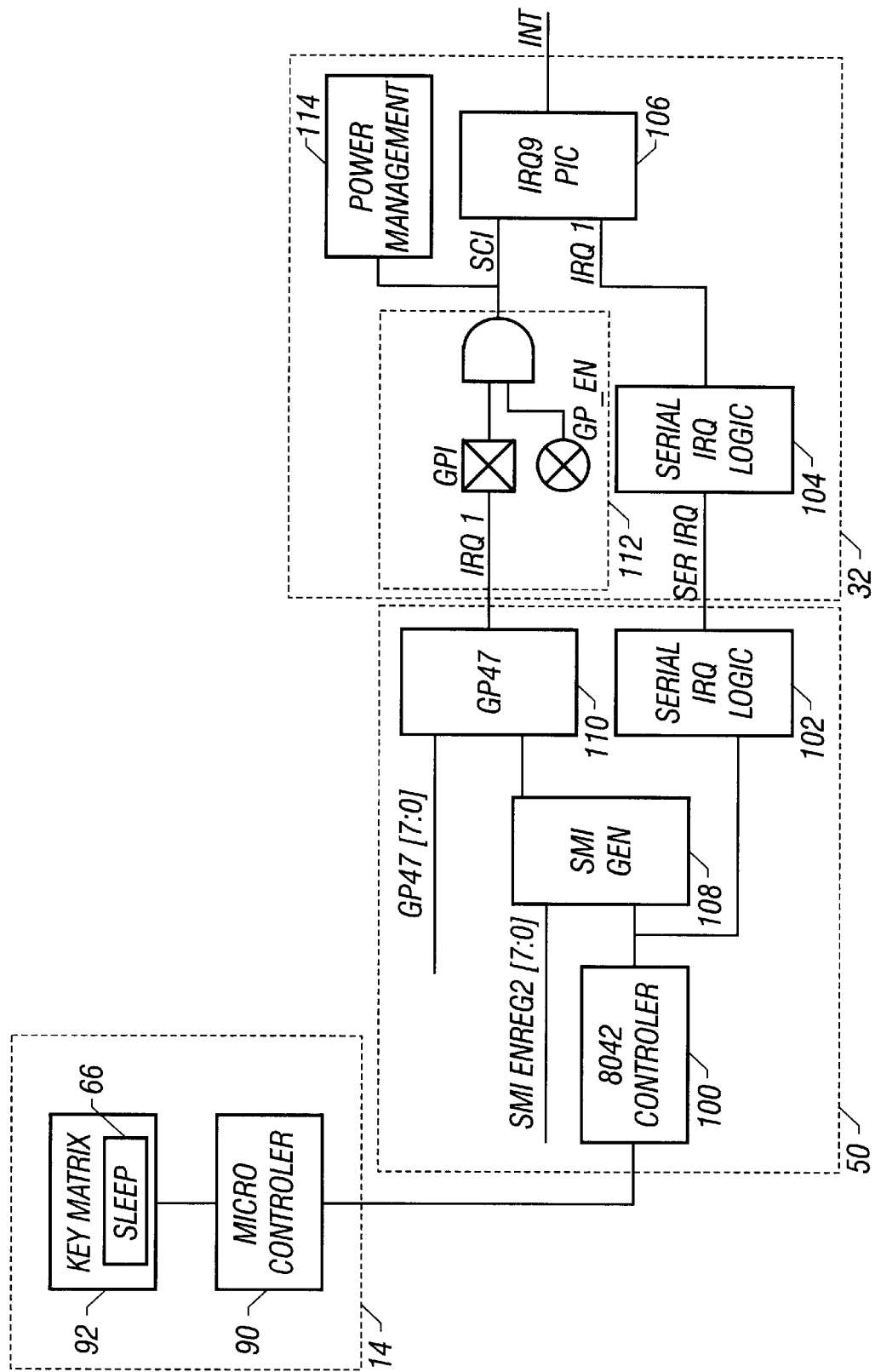
FIG. 4A is a detailed block diagram representing routing logic for a keyboard interrupt, according to the preferred embodiment.

Now turning to FIG. 4A, there is illustrated a block diagram of interrupt routing logic in support of the sleep mode key 66 according to the preferred embodiment. The multifunction input/output (I/O) controller 50 includes an 8042 compatible keyboard controller 100 and serial interrupt logic 102. Generally, the 8042 compatible keyboard controller 100 receives data from the keyboard scan controller 90 and in turn provides an interrupt (IRQ1) to the processor 20 to request service. Conventionally, the interrupt (IRQ1) is provided to a programmable interrupt controller (PIC) 106 of the south bridge 32. The programmable interrupt controller prioritizes the interrupts and provides the processor 20 with the address (vector) of the keyboard controller 100 interrupt service routine or driver for processing keyboard input.

Interrupts originating in the multifunction input/output (I/O) controller 50 and passed to the south bridge 32 are passed in a serial interrupt scheme which adheres to the "Serial IRQ Specification for PCI Systems" version 6.0. The multifunction input/output (I/O) controller 50 includes serial interrupt logic 102 for time-division multiplexing a number of interrupts onto a serial interrupt (SERIRQ) signal. The south bridge 32 includes serial interrupt logic 104 for demultiplexing the interrupts from the serial interrupt signal (SERIRQ) and presenting the interrupts in a parallel fashion to the programmable interrupt controller 106.

In addition to providing the keyboard controller interrupt (IRQ1) in the serial interrupt stream, the multifunction input/output controller 50 is configurable to provide the keyboard interrupt (IRQ1) to the south bridge 32 independently in a parallel fashion from a general-purpose output (GP47), as described next.

According to the preferred embodiment, a system management interrupt (SMI) generator 108 is configurable by a SMI enable register 2 (SMI_ENREG2) to generate a internal SMI signal based on a number of sources, including the keyboard interrupt. By writing a 0x82 value to the system management interrupt (SMI) enable register 2, the SMI generation logic 108 will generate an interrupt solely based on the keyboard controller interrupt. The generation is disabled if a 0xB5 is written. Thus, the SMI signal generated by the SMI generation logic 108 is actually IRQ1 of the keyboard controller 100.

Additionally, the multifunction input/output controller 50 includes a general-purpose output 47 (GP47) that is configurable to provide the SMI signal externally by writing a 0x10 to the GP47 register. To disable the output a 0xC7 is written. It should be understood that while the SMI nomenclature is used by the multifunction input/output controller 50, since the SMI signal is configured to originate only with the keyboard interrupt—the SMI signal is actually the keyboard interrupt signal (IRQ1). Thus, the SMI enable register 2 108 and the general-purpose output 47 (GP47) 110 act as gating or routing logic for providing a second copy of the interrupt generated by the keyboard controller 100.

Furthermore, according to the preferred embodiment, the keyboard interrupt provided by GP47 is connected to a general-purpose input (GPI1) of the south bridge 32. When a signal is asserted on the general purpose input (GPI1), a bit is set in a general-purpose status register (GPI_STS) 112, also known as the ACPI event status register. If a general-purpose enable register (GP_EN) is set then the setting of the GPI_STS bit will generate a system control interrupt (SCI). The general-purpose status register is enabled by writing a 0x10 to the general-purpose enable register; and disabled by writing 0x00.

The system control interrupt (SCI) is internally connectable to the IRQ9 input of the programmable interrupt controller 106. Other interrupt inputs can be used, such as IRQ10 or IRQ11.

According to the Intel 82371, the system control interrupt is an internal interrupt of the south bridge 32 used to manage power for the computer system S in accordance with the ACPI specification.

It is noted that other interrupts of the multifunction input/output controller 50 could be routed using the principles disclosed above. For example, a universal asynchronous receiver/transmitter (UART) or serial port contained in the multifunction input/output controller 50 may be connected to an external modem. The interrupt from the serial port could be routed to the general-purpose status register 112 to provide a wake indication when the external modem receives a phone call. One of ordinary skill in the art should recognize that other legacy devices are configurable in the same manner to the provide a wake function similar to the keyboard.

Figure 4B:
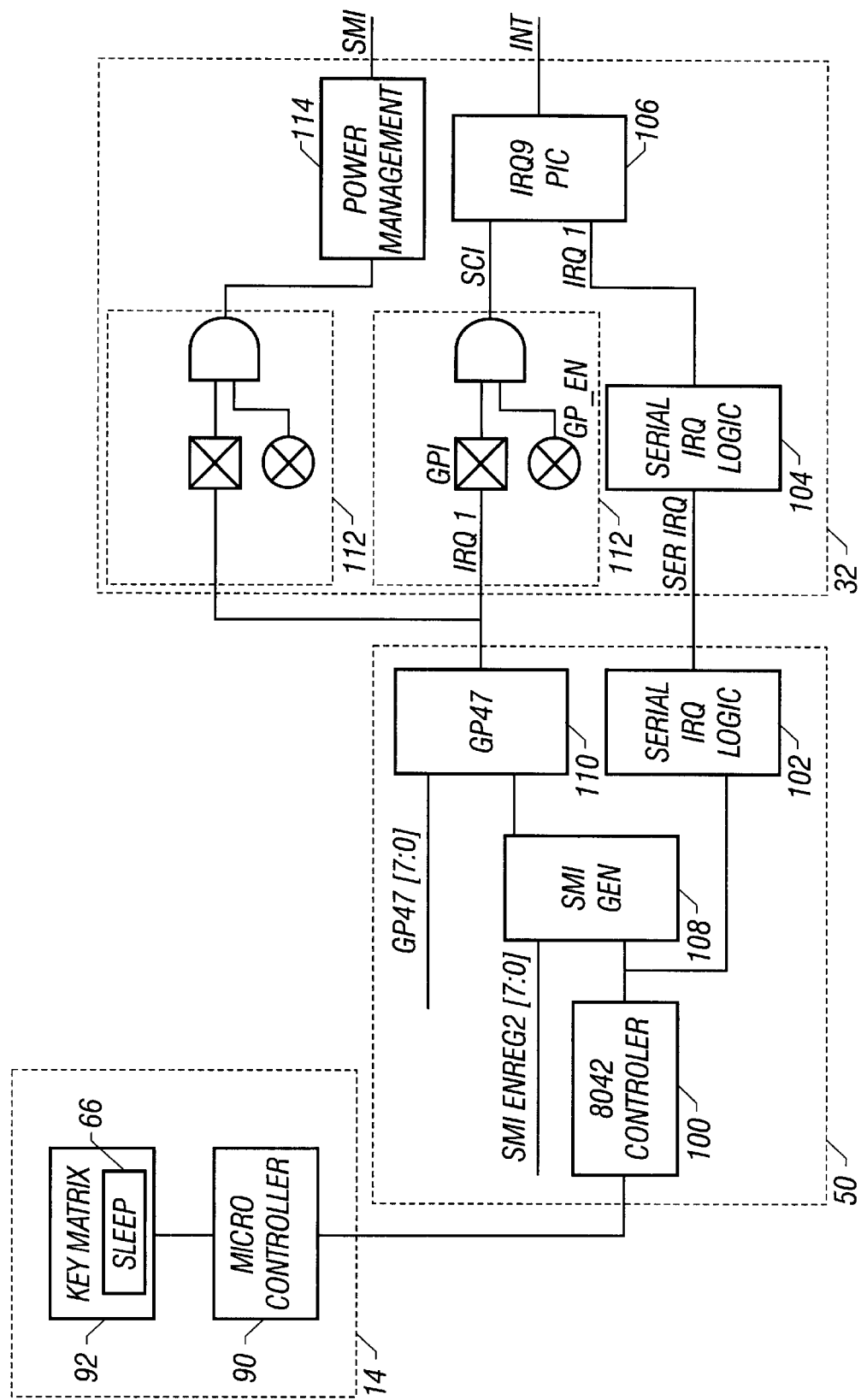
FIG. 4B is a detailed block diagram representing routing logic for a keyboard interrupt, according to an alternative embodiment.

Referring now to FIG. 4B, there is illustrated a block diagram according to an alternative embodiment. The logic is similar to that illustrated in FIG. 4A, except that instead of generating an internal system control interrupt to the programmable interrupt controller 106, the general-purpose status register 112 is configured to generate a system management interrupt (SMI). GP47 is also connected to a second bit of the general-purpose status register, such as the ring bit, to generate the system control interrupt as in FIG. 4A. The SMI will take higher priority than the interrupt generated by the programmable interrupt controller 106 and the difference will be explained below.

Figure 5:
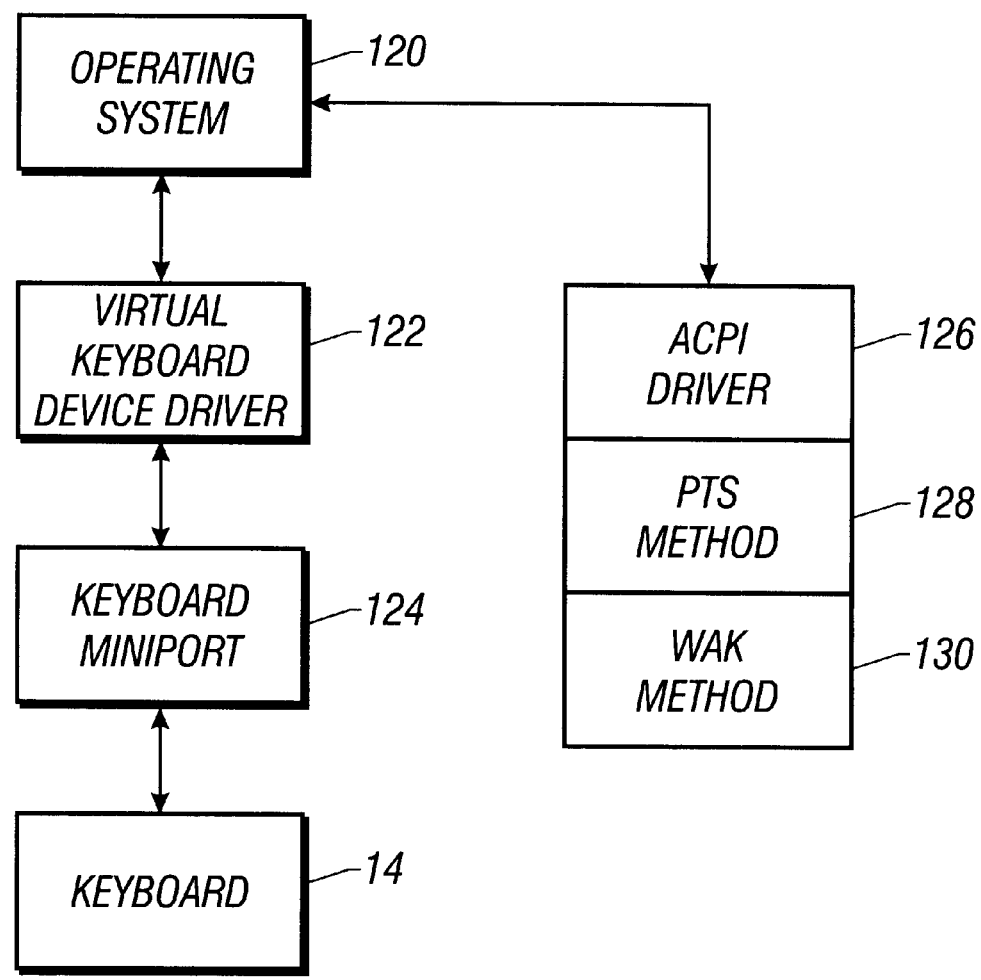
FIG. 5 is a block diagram illustrating software device driver architectures operable on the computer system of FIG. 1 for responding to keystrokes, according to the preferred embodiment.

Turning now to FIG. 5, there is illustrated a software architecture for supporting the keyboard sleep mode key 66. The preferred operating system is Microsoft® Windows™ 98. However, one of ordinary skill in the art will be able to apply the principles disclosed herein to alternate versions of Windows, (hereinafter collectively operating system or "OS") 120. The operating system 120 is capable of calling a keyboard device driver 114 for processing keyboard scan codes. The scan codes are typically passed onto the application running at the time. However, certain special OS-level scan codes, such as Ctl-Alt-Delete, are filtered by the keyboard device driver for passing to the OS.

Special scan codes are defined for power events, sleep events and wake events as part of an On-Now technology initiative by the computer industry. These scan codes are listed in Table I. If a keyboard is not capable of providing the special scan codes, a filter driver 124 can be provided to convert the assigned sleep mode scan code into an On-Now compliant scan code that is understood by the OS. The filter driver is also useful where multiple keyboards may be used with one computer. One keyboard may be compliant and not need the filter driver 124 while another keyboard driver may require the filter driver 124. A filter driver can be supplied with a particular keyboard to overcome any differences without requiring any changes to keyboard or system BIOS. If the keyboard 14 is capable of providing the proper scan codes, the filter driver 124 may not be needed if the keyboard 14 can accept a command to disregard, filter-out or ignore all keys except the sleep/wake key 66.

TABLE I

| EVENT | MAKE CODE | BREAK CODE |
|---|---|---|
| Power event: Set 1 | E0, 5E | E0, DE |
| Power event: Set 2 | E0, 37 | E0, F0, 37 |
| Sleep event: Set 1 | E0, 5F | E0, DF |
| Sleep event: Set 2 | E0, 3F | E0, F0, 3F |
| Wake event: Set 1 | E0, 63 | E0, E3 |
| Wake event: Set 2 | E0, 5E | E0, F0, 5E |

The OS 120 is also capable of calling an ACPI driver 126 which is capable of calling a put-to-sleep (PTS) control method 128 and a wake (WAK) control method 130. These modules are further explained below.

Figure 6A:
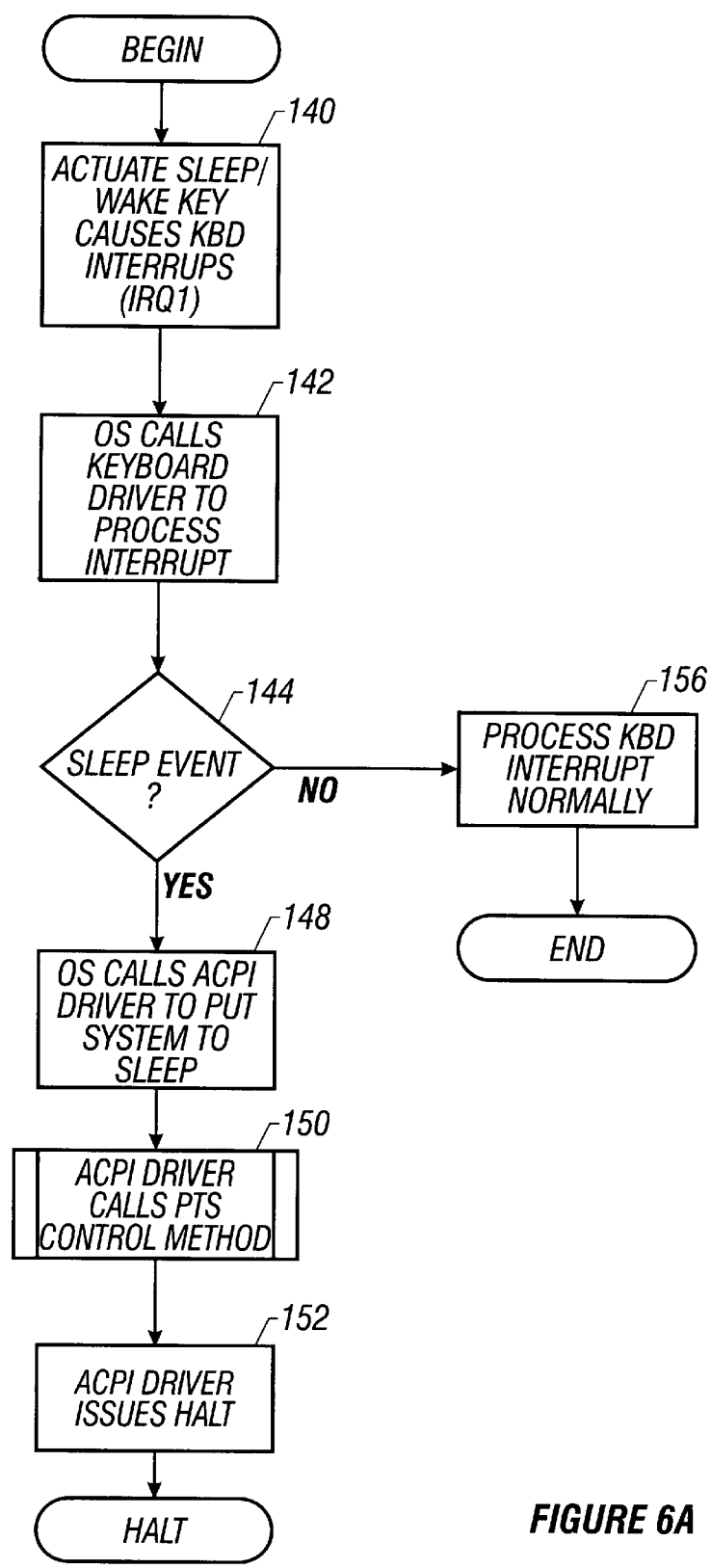
FIGS. 6A–D are flowcharts illustrating a method of handling the keyboard interrupt requests, according to the preferred embodiment.

The operation of the above hardware and software described above is further described below in conjunction with the flow diagrams in FIGS. 6A–D. Referring first to FIG. 6A, there is illustrated a sequence of steps for putting the computer system S to sleep according to the preferred embodiment. The computer system S is assumed to be compatible with the ACPI specification and running Windows 98 or another suitable ACPI compliant OS.

At step 140, the sleep/wake key 66 is actuated which causes the keyboard controller 100 to issue an interrupt to the processor 20. Between the keyboard controller 100 and the processor 20, the interrupt flows through the serial interrupt logic 102 and 104 and is registered in the programmable interrupt controller 106 as IRQ1. At step 142, the OS calls the keyboard driver 122 after determining the source of the interrupt. The keyboard driver 122 typically passes the scan codes to the OS for passing onto an application. However, the sleep mode key 66 preferably generates a sleep event scan code, which causes at step 134 the OS to call an ACPI driver 126. Otherwise at step 156, the OS handles the scan code in a routine fashion.

At step 148 the OS calls the ACPI driver 126 to put the computer system S to sleep in accordance with the particular ACPI implementation. As part of the preferred implementation, the ACPI driver will call the PTS control module 128 at step 150. After the PTS control method returns control to the ACPI driver 126 and the hardware is powered down in accordance with the ACPI implementation, the ACPI driver 126, at step 152, causes a HALT instruction to be executed to place the processor 20 in a low power state.

Figure 6B:
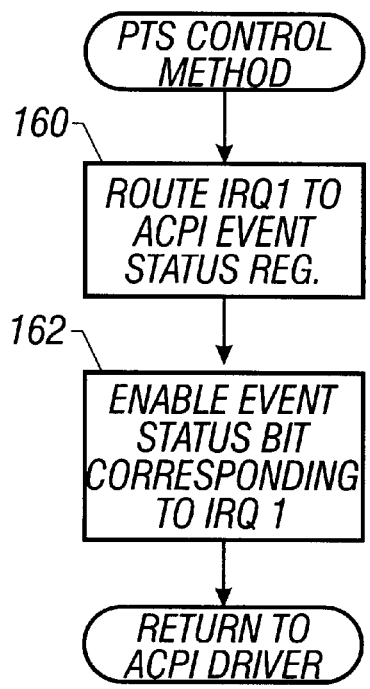

Referring now to FIG. 6B, there is illustrated the put-to-sleep (PTS) control method 128. The PTS control method handles routing the keyboard interrupt through an alternate path for supporting the generation of an ACPI event to wake the system. After being called by the ACPI driver 128, at step 160 the PTS control method 128 configures the multifunction input/output controller 50 to provide the keyboard interrupt from GP47. In the preferred embodiment, this is accomplished by writing a 0x82 value to the system management interrupt (SMI) enable register 2 108 and a 0x10 value to the GP47 register 110. At step 162, the PTS control method 128 enables the GPI_STS bit in the ACPI event status register. Thus the keyboard controller interrupt may be used as an external event to an ACPI event or interrupt. The PTS control method returns control to the ACPI driver 128 when finished.

Figure 6D:
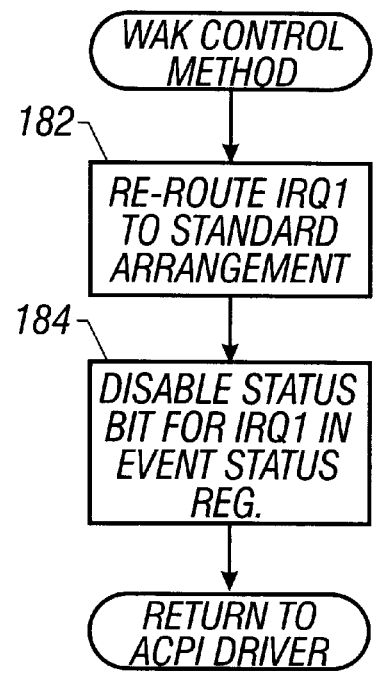
Figure 6C:
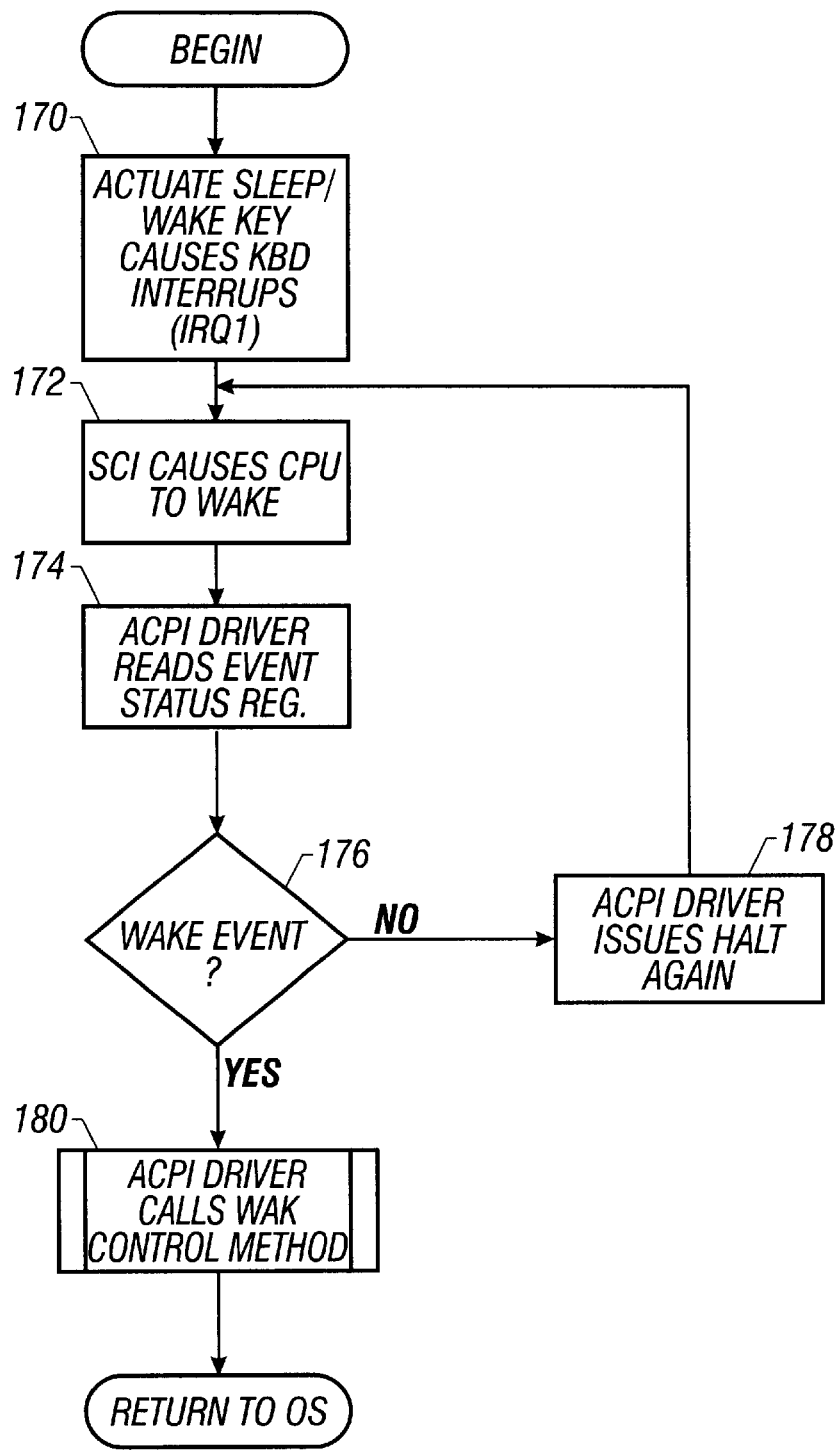

The method of FIGS. 6C–D are executed to wake the computer system S and reverse the configuration of FIGS. 6A–B. At step 170, the sleep/wake key 66 is actuated which causes the keyboard controller 100 to attempt issue an interrupt to the processor 20. At this point, the processor is asleep and the programmable interrupt controller 106 is disabled for IRQ1. So the conventional keyboard interrupt provided to IRQ1 of the programmable interrupt controller 106 is ineffective at generating an interrupt to the processor at this point. However, the alternate path for the keyboard interrupt is enabled since the PTS control method 128 made it so.

The alternate path causes a system control interrupt (SCI) to be provided to IRQ9 which causes an interrupt (TNT) to the processor 20. Depending upon the processor, the power management unit 114 may also start clocks or accelerate clocks to the processor 20 to begin the process of waking the system. At step 172, the system control interrupt (SCI) causes the processor 20 to wake from HALT. At this point, control is still with the ACPI driver 126, which reads the ACPI event status register to determine if a valid ACPI event has occurred. If a valid event has occurred the ACPI driver will cause the computer system S to awake. If not, at step 178 the ACPI driver causes a HALT instruction to be executed again to put the computer system S back asleep. If at step 176 it is determined that a wake event has occurred, such as the sleep/wake key 66 event, the ACPI driver 126 proceeds to step 180 to call a wake (WAK) control method. After the wake control method is executed, the ACPI driver returns control to the operating system.

Turning now to FIG. 6D, there is illustrated the wake (WAK) control method 130. The WAK control method 130 handles reversing the routing performed by the PTS control method 128 so that the keyboard interrupt is processed normally. At step 182 the WAK control method 130 disables the routing of the keyboard interrupt in the multifunction input/output controller 50. In the preferred embodiment, this is accomplished by writing a 0xB5 value to the system management interrupt (SMI) enable register 2 108 and a 0xC7 value to the GP47 register 110. At step 184, the event status bit (GPI_STS) 112 in the ACPI event status register is disabled by writing a 0x00 to the general purpose enable register. Afterwards, control is returned to the ACPI driver 126. Thus, the keyboard interrupt is selectively routed to the status register 112 to wake the computer system without requiring any changes to keyboard controller BIOS code.

Referring back to FIG. 4B, one of ordinary skill in the art should recognize that since the software for managing the routing of the keyboard interrupt is mostly contained in the PTS control method 128 and the WAK control method 130, these modules could be performed from system management mode.

When the computer system receives a sleep indication from the keyboard, the PTS control method enables a second bit in the general-purpose status register 112; disables IRQ1 on the programmable interrupt controller 106; enables the routing logic to provide the keyboard interrupt from GP47 as described above; and commands the keyboard 14 to only provide the wake scan code. The second bit in the general-purpose status register 112 is preconfigured to generate a system management interrupt (SMI) when the keyboard interrupt is received. Upon receipt of a next keyboard interrupt (wake scan code), an SMI will be provided to the processor 20 which causes a wake routine to be run from system management mode. The wake routine will disable the second bit the general-purpose status register 112 so that an SMI is not generated again. Upon completing the SMI routine, the processor 20 will next service the system control interrupt (IRQ9) to complete waking the computer system 20.

Thus, there has been described and illustrated herein, a method and apparatus for an ACPI compliant keyboard sleep key. However, those skilled in the art should recognize that many modifications and variations in the size, shape, materials, components, circuit elements, wiring connections and contacts besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A method of managing power in a computer system including a processor operable under an operating system, said computer system including a keyboard having keys to cause generation of scan codes and keyboard interrupts in response to key actuation; comprising:

in response to a sleep event initiated by actuation of a keyboard key or key combination when the computer system is not in a low power mode, generating a scan code and a keyboard interrupt and inputting said keyboard interrupt to an interrupt controller for said processor, said scan code causing the operating system to place the computer system in a low power mode disabling response of the interrupt controller to keyboard interrupts, and enables response of a power event status register to a keyboard interrupt; and in response to a wake up event initiated by actuation of a keyboard key while the processor is in said low power mode in which response of said interrupt controller to keyboard interrupts is disabled, generating a scan code and a keyboard interrupt, said keyboard interrupt being routed to said power event status register to apply a system control interrupt to said interrupt controller effective to generate an interrupt for said processor, and said scan code causing operating system initiation of a wake up routine and disablement of response of said power event status register to a keyboard interrupt.

2. The method of claim 1, wherein the entry of the computer system into the low power mode and the wake up of the computer system from the low power mode are controlled by operating system calls to an ACPI driver.

3. A method according to claim 1, wherein causing the operating system to place the computer system in a low power mode disables inputs to the interrupt controller except for an input connected to the power event status register to permit said application of a system control interrupt to the interrupt controller in response to said wake up event.

4. A method according to claim 1, wherein the scan code generated by actuation of said predetermined key or key combination when the computer system is not in a low power mode is converted to sleep event scan code to which the operating system is responsive.

5. A method according to claim 1, wherein a said wake up event is initiated by actuation of said predetermined keyboard key or key combination.

6. A method according to claim 1, wherein when the operating system places the computer system in said low power mode, subsequent actuation of a keyboard key is operable only to generate a wake scan code.

7. A computer system comprising:

a processor operable under an operating system;

a keyboard including keys and a keyboard controller operable to generate scan codes and keyboard interrupts in response to key actuation;

an interrupt controller to receive keyboard interrupts from the keyboard controller in response to actuation of a keyboard key or a keyboard key combination;

wherein actuation of a predetermined key or key combination when the computer system is not in a low power mode generates a keyboard interrupt and a scan code that causes the operating system to place the computer in a low power mode disabling response of said interrupt controller to keyboard interrupts, and enables response of a power event status register to a signal input from a keyboard interrupt; and wherein when the computer system is in said low power mode, a keyboard interrupt generated in response to actuation of a keyboard key routed to the power event status register causes application by said power event status register of a system control interrupt to said interrupt controller to generate a processor interrupt, and the operating system is responsive to said actuation of a keyboard key to initiate a wake up routine and to disable response of said power event status register to a keyboard interrupt.

8. The computer system of claim 7, wherein placing said computer system into a low power mode and wake up of the computer system from the low power mode is effected by the operating system in conjunction with an advanced configuration and power interface specification (ACPI) driver.

9. The computer system of claim 7, wherein actuation of said predetermined key or key combination causes a special scan code to be generated to which the operating system is responsive to initiate a sleep routine when the computer system is not in a low power mode and to initiate a wake up routine when the computer system is in a low power mode.

10. The computer system of claim 7, wherein the keyboard controller is included in a multifunction input/output controller and the power event status register is included in a south bridge.

11. The computer system according to claim 7, wherein the scan code generated by actuation of said predetermined key or key combination when the computer system is not in a low power mode is converted to sleep event scan code to which the operating system is responsive.

12. A computer system according to claim 7, wherein a said wake up event is initiated by actuation of said predetermined keyboard key or key combination.

13. A computer system according to claim 7, wherein when the operating system places the computer system in said low power mode, subsequent actuation of a keyboard key is operable only to generate a wake scan code.

14. A computer system comprising:

a processor operable under an operating system;

a keyboard including keys and a keyboard controller operable to generate scan codes and keyboard interrupts in response to key actuation;

said keyboard controller coupled to an interrupt controller operable in response to a keyboard interrupt to generate a processor interrupt when the computer system is not in a low power mode; a switchable signal path coupled between said keyboard controller and a power event status register;

wherein actuation of a predetermined key or key combination when the computer system is not in a low power mode generates a keyboard interrupt that is input to said interrupt controller to generate a processor interrupt, and a scan code that causes the operating system to place the computer in a low power mode disabling response of said interrupt controller to keyboard interrupts and to enable said switchable signal path; and wherein when the computer system is in said low power mode in which response of said interrupt controller to keyboard interrupts is disabled, a keyboard interrupt generated in response to actuation of a keyboard key is routed over said enabled switchable signal path to the power event status register apply a system control interrupt to said interrupt controller to generate a processor interrupt, and the operating system is responsive to said actuation of a keyboard key to initiate a computer system wake up routine and to disable said enabled switchable signal path.

15. A computer system according to claim 14, wherein when the operating system places the computer system in said low power mode, subsequent actuation of a keyboard key is operable only to generate a wake scan code.

16. A computer system according to claim 14, wherein a said wake up event is initiated by actuation of said predetermined keyboard key or key combination.

17. A method of managing power in a computer system including a processor operable under an operating system, said computer system including a keyboard having keys to cause generation of scan codes and keyboard interrupts in response to key actuation; comprising:

in response to a sleep event initiated by actuation of a keyboard key or key combination when the computer system is not in a low power mode, generating a scan code and a keyboard interrupt and inputting said keyboard interrupt to an interrupt controller for said processor, said scan code causing the operating system to place the computer system in a low power mode disabling response of the interrupt controller to keyboard interrupts, and enables response of a power event status register to a keyboard interrupt; and in response to a wake up event initiated by actuation of a keyboard key while the processor is in said low power mode, generating a scan code and a keyboard interrupt, said keyboard interrupt being routed to said power event status register to apply a system control interrupt to said interrupt controller effective to generate an interrupt for said processor, and to cause initiation of a wake up routine from a system management mode prior to operation of the processor in response to the system control interrupt to complete wake up of the computer system, and disablement of response of said power event status register to a keyboard interrupt.

18. The method of claim 17, wherein the entry of the computer system into the low power mode and the wake up of the computer system from the low power mode are controlled by operating system calls to an ACPI driver.

19. A computer system comprising:

a processor operable under an operating system;

a keyboard including keys and a keyboard controller operable to generate scan codes and keyboard interrupts in response to key actuation;

said keyboard controller coupled to an interrupt controller operable in response to a keyboard interrupt to generate a processor interrupt when the computer system is not in a low power mode;

a switchable signal path coupled between said keyboard controller and a power event status register;

wherein actuation of a predetermined key or key combination when the computer system is not in a low power mode generates a keyboard interrupt that is input to said interrupt controller to generate a processor interrupt, and a scan code that causes the operating system to place the computer in a low power mode disabling response of said interrupt controller to keyboard interrupts and to enable said switchable signal path; and wherein when the computer system is in said low power mode, a keyboard interrupt generated in response to actuation of a keyboard key is routed over said enabled switchable signal path to the power event status register to apply a system control interrupt to said interrupt controller to generate an interrupt for said processor, and to cause initiation of a wake up routine from a system management mode prior to operation of the processor in response to the system control interrupt to complete wake up of the computer system, and disablement of said switchable signal path.

20. A method according to claim 19, wherein when the operating system places the computer system in said low power mode, subsequent actuation of a keyboard key is operable only to generate a wake scan code.

21. The method of claim 20, wherein the entry of the computer system into the low power mode and the wake up of the computer system from the low power mode are controlled by operating system calls to an ACPI driver.

22. A computer system according to claim 19, wherein said switchable signal path is coupled to individual bits of said power event status register, to generate in response to a keyboard interrupt resulting from actuation of a keyboard key when the computer system has been placed in said low power mode a system management interrupt initiates said wake up routine from system management mode and to apply said system management interrupt to said interrupt controller.

* * * * *